United States Patent [19]

Hoashi

[11] Patent Number: 5,398,038
[45] Date of Patent: Mar. 14, 1995

[54] METHOD AND APPARATUS FOR DISPLAYING COLOR IMAGES

[75] Inventor: Katsutoshi Hoashi, Tokyo, Japan

[73] Assignee: Ikegami Tsushinki Co., Ltd., Tokyo, Japan

[21] Appl. No.: 152,700

[22] Filed: Nov. 16, 1993

[30] Foreign Application Priority Data

Nov. 17, 1992 [JP] Japan .................. 4-307246

[51] Int. Cl.⁶ ............................................. G09G 5/02
[52] U.S. Cl. ........................................ 345/5; 345/22; 345/88; 348/742
[58] Field of Search ............... 345/4, 5, 22, 150, 151, 345/88; 348/742, 743

[56] References Cited

U.S. PATENT DOCUMENTS

| | | | |
|---|---|---|---|
| 3,781,465 | 12/1973 | Ernstoff et al. | 348/742 |
| 3,821,796 | 6/1974 | Ernstoff et al. | 348/743 |
| 4,482,919 | 11/1984 | Alston et al. | |
| 4,758,884 | 7/1988 | Roy . | |

FOREIGN PATENT DOCUMENTS

59-016482  1/1984  Japan .
2128577    5/1990  Japan .
432295    11/1992  Japan .
5-91518    4/1993  Japan .

*Primary Examiner*—Jeffery Brier
*Attorney, Agent, or Firm*—Finnegan, Henderson, Farabow, Garrett & Dunner

[57] ABSTRACT

The field image signal for each of the color components of a frame color image signal is formed into a signal of odd number field groups and even number field groups of predetermined color sequence connected together in series, and with the color component sped up several times. The signal is scanned, with the signal of a specific color component deflected vertically by half the horizontal scanning spacing amount, the odd number fields and even number fields being deflected in opposite directions. As a result odd number and even number field images are displayed on the black and white display at respective established locations. At the same time, the light color changing means is driven with a signal corresponding to the color component signal, and the non color light signal displayed in black and white is changed into a light signal of a color component corresponding to the signal. As a result a high resolution color image is displayed without color aberration.

4 Claims, 6 Drawing Sheets

METHOD AND APPARATUS FOR DISPLAYING COLOR IMAGES

BACKGROUND OF THE INVENTION

1. Field of the Invention

The present invention relates to a method and apparatus for converting a black and white image into a color image by means of a light color changing device driven by a color image signal which has been resolved into its color components.

2. Description of the Related Art

Apparatus which display the black and white image displayed on a black and white display as color images, achieve this by arranging, on the front of a black and white monitor screen, liquid crystal shutters which can selectively pass the three primary colors namely red, green and blue from an incident white light. A changing signal corresponding to the signal for the black and white display is input to the liquid crystal shutter, and as a result the black and white image on the black and white display appears as a color image.

In displaying a color image using such a liquid crystal element however, particularly in the case of a moving color image, the following problems arise.

That is to say, with a normal television image, instead of changing the number of scanning lines to increase the resolving power, so called interlace scanning which scans odd and even number fields with the fields shifted by half the distance between the scanning lines is carried out. In this way the vertical resolving power of the image can be maintained by shifting of the scanning positions relative to each other without increasing the field cycle.

In the case of a color display, a color image signal which has been resolved into its red, green and blue (denoted hereafter by R, G, B) color components is simultaneously scanned to effect color display. With the before-mentioned apparatus using a liquid crystal shutter however, R, G, B signals are alternately input, and a light signal for each color component is selectively output. As a result, if for example the simultaneously input R, G, B, field image signal is only simply rearranged into a one line sequence, and output as a serial signal, it is not possible to display all of the input signal, and as a result at least ⅔ of the field is discarded. Consequently, the original image reproduction ratio for the time axis direction drops to ⅓, so that a real time moving image cannot be displayed. As a simple method to overcome this problem, it is possible to output the field image signal by switching the color components for each field. However in this method, the period for the color image display of an R, G, B unit is trebled, and since there is a single field time shift in the image for each color component, an undesirable color shift occurs in the moving part of the image display.

It has been considered to output the R, G, B image signals of the simultaneously input single fields as a serial signal which has been sped up 3 times. If this is done, the color resolved R, G, B image signal can be scanned at three times the speed. As a result, the color image of a single field can be displayed with a predetermined cycle, and thus satisfy the high speed characteristics. However, in this case, since the fields are input as a succession of the odd number field and even number field three times for each R, G, B image signal, the balance of the alternating pattern for the odd number field and the even number field on the display side collapses. Some method of overcoming the above problems is thus required.

SUMMARY OF THE INVENTION

It is an object of the present invention to be able to follow precisely the movement of a moving image, and to obtain a high resolution color image on a color display system using a black and white display, while image signals for each color component are being changed in a device such as a liquid crystal shutter.

To achieve the above object, it is also an object to effect interlace scanning even between the field images of each color component so that image aberration can be prevented.

It is a further object to obtain a high resolution color image with minimum deterioration, without carrying out image processing.

In order to achieve the above objectives, the method and apparatus for displaying color images according to the present invention comprises:

a signal processing step or means, wherein or whereby the field image signals for each color resolved component (for example R, G, B) of a frame color image signal comprising odd number and even number field images, are connected together in series in a predetermined color sequence as odd number field groups and even number field groups (R odd→G odd→B odd→R even→G even→B even), and changed into a signal having the color components sped up several times (for example three times), a vertical deflection shift step or means, wherein or whereby the signal for a characteristic color component (for example the green, red or blue component) of the changed signal is shifted by only half the horizontal scanning spacing in a vertical direction, with the signals for the odd number field images and even number field images being shifted in opposite vertical directions, and the shifted signals are output to and scanned on a black and white image display means which has a function to display odd number field images and even number field images alternately, so that the odd number and even number field images are displayed at respective established locations on the black and white display means, and a light color changing step or means, wherein or whereby a signal which has been divided up corresponding to tile color component signal of said changed signal, is input and tile non color light signal displayed on the black and white display means is changed into a light signal having a color component corresponding to the input signal.

With the black and white image display means according to the above method and apparatus, irrespective of the field type of the synchronous signal for the display, the respective image signals for each of the color components are interlace scanned at the location of the odd number field when the image signal is for the odd number field, and at the location of the even number field when the image signal is for the even number field, and appear as black and white images without distortion of the image of the original picture. On the other hand, the light color changing means changes the non color light signal of the black and white image appearing on the black and white image display means into a light signal having color components corresponding to the image signals. That is to say, a light image signal for each color component is generated alternately at high speed, so that the human eye recognizes these color components as composite color images. Since distortion of the black and white displayed image is prevented by interlace scanning, then also the image converted by the light color changing means can be obtained as a color image having minimal color aberration.

Since the positions of the image signals for the respective color components are suitably corrected for the successive odd number field and even number field, and interlace scanned, then it is possible to obtain an image with high resolution and minimal distortion compared to that obtained with odd number field/even number field signal construction with digital processing using a memory.

Moreover, with the above-mentioned light color changing step or means, both the liquid crystal shutter and the liquid crystal shutter drive may be used for changing the light color, so that adequate switching response can be maintained.

The before-mentioned objects of the present invention will become apparent from the following description of aspects of the present invention given in conjunction with the appended drawings.

DESCRIPTION OF THE PREFERRED EMBODIMENTS

First is a description of an apparatus used in the embodiment of the present invention for switching light color, which utilizes TN mode liquid crystal elements as liquid crystal shutters.

In the basic construction of a TN mode liquid crystal element, the liquid crystal element is oriented so that the liquid crystal molecules therein are distributed to lie in a twisted direction to the axis of light incident on the element. The incident surface and output surface of the element are sandwiched between transparent electrodes, and the outer surfaces of the electrodes are sandwiched between color polarizers.

Figure 5:
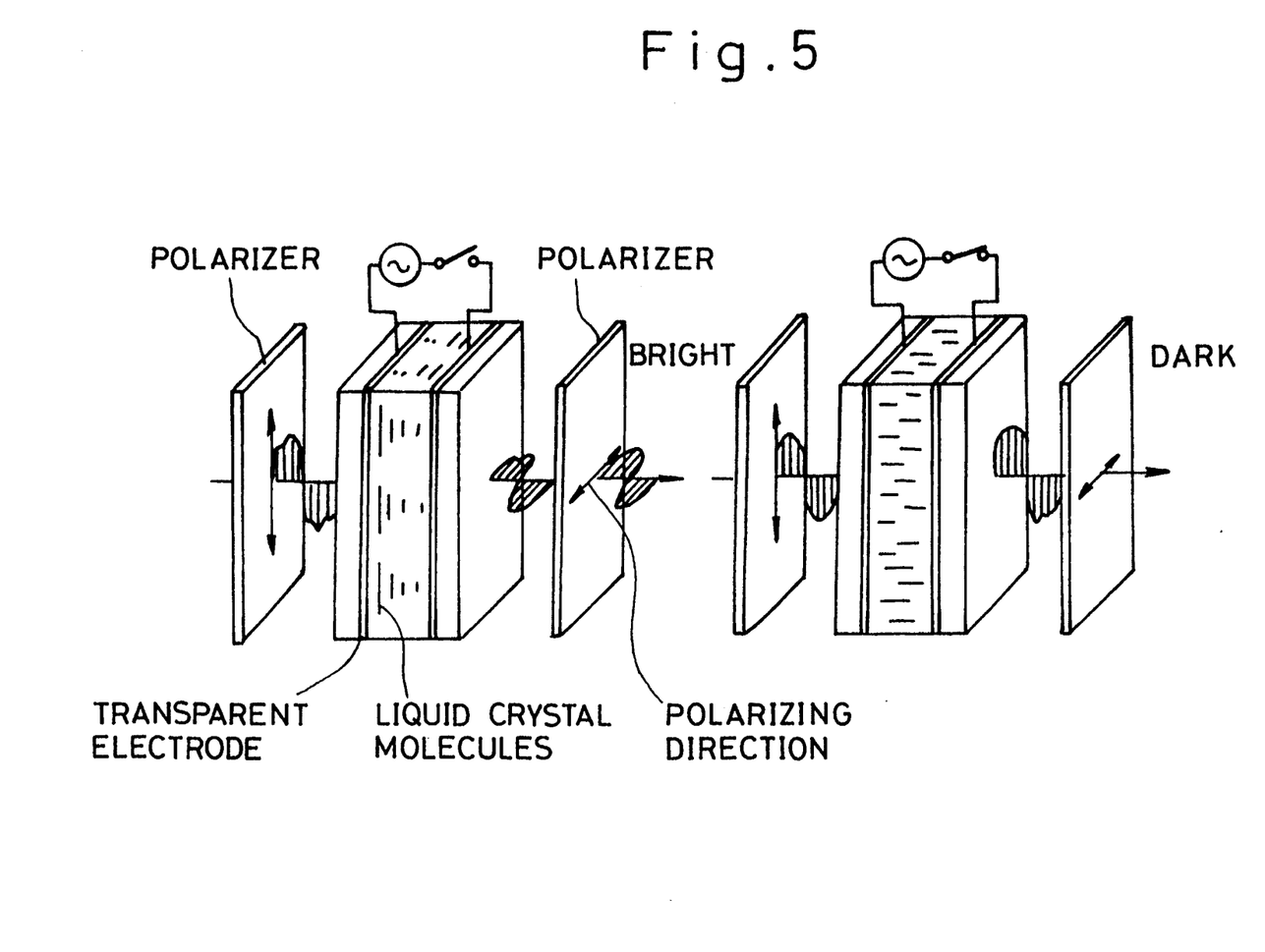
FIG. 5 is a schematic diagram illustrating an operating principle of a twisted nematic (TN) liquid crystal element.

The operation of the TN mode liquid crystal element will be briefly explained with reference to FIG. 5. With this element, the polarizing direction of the polarizers on the incident side and output side are set so as to be perpendicular to each other.

In the "off" condition of the TN mode liquid crystal element, with no voltage applied across the electrodes, light passes through the polarizer on the incident side and strikes the element. The polarizing direction of the light is changed in the element through 90 degrees, due to the twist of the liquid crystal molecules, and since the direction then conforms to the polarizing direction of the polarizer on the output side, the light passes straight through. In the "on" condition with a voltage applied across the electrodes, since the liquid crystal molecules are untwisted, the light continues on with the same polarizing direction as at the time of incidence, and since its polarizing direction is perpendicular to that of the polarizer on the output side, it is blocked.

Figure 6:
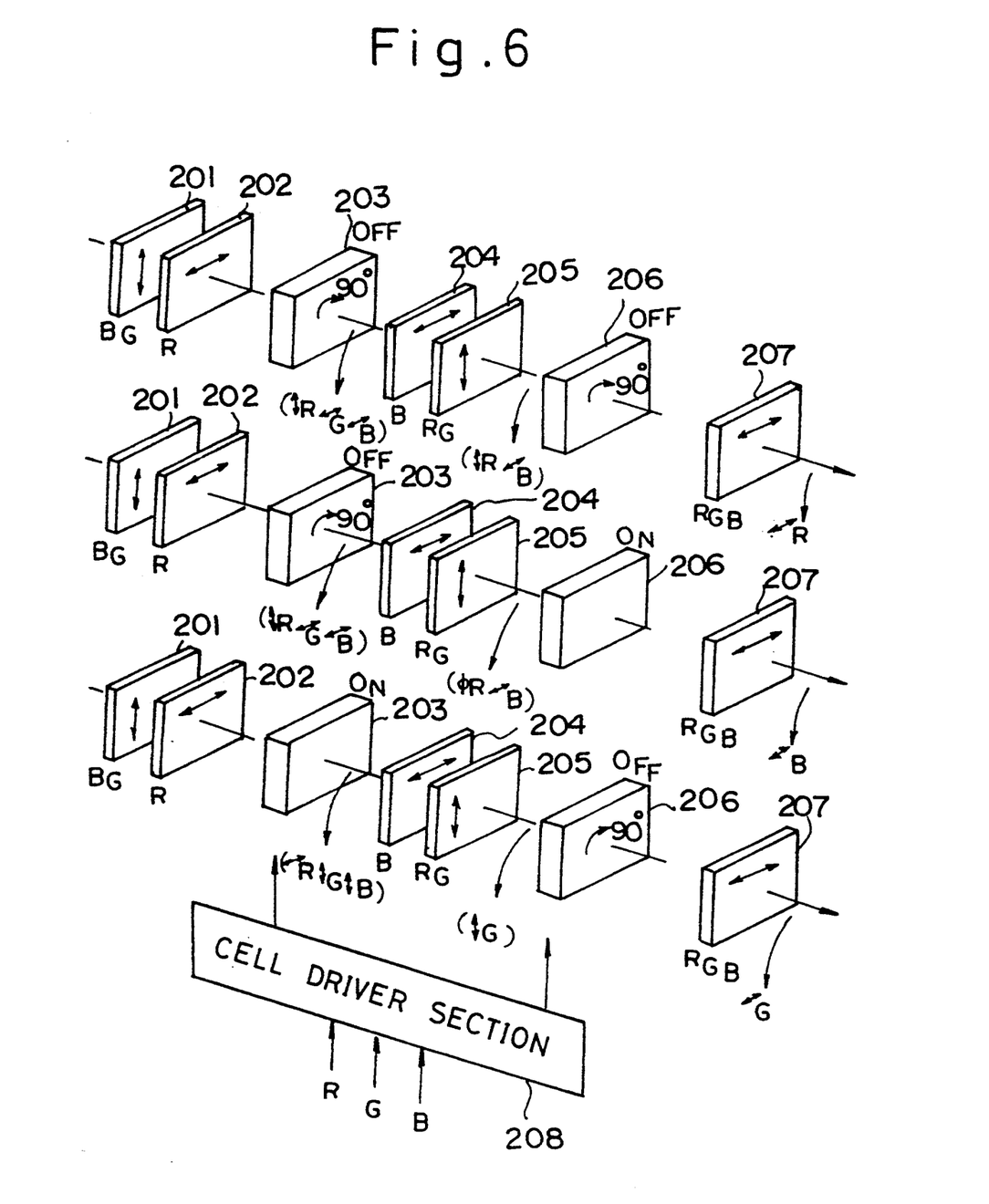
FIG. 6 is a schematic diagram illustrating an operating principle of a liquid crystal shutter using TN liquid crystal elements.

Two TN mode liquid crystal elements functioning according to the above theory are used to make up a liquid crystal shutter having the before-mentioned functions. As shown in FIG. 6, the shutter is provided with, in sequence from the incident side (left side in the figure), a BG dichroic polarizing filter 201 which passes blue and green light in the vertical polarizing direction, an R dichroic polarizing filter 202 which passes red light in the horizontal polarizing direction, a TN mode liquid crystal element 203, a B dichroic polarizing filter 204 which passes blue light in the horizontal polarizing direction, an RG dichroic polarizing filter 205 which passes red and green light in the vertical polarizing direction, a TN mode liquid crystal element 206, and an RGB dichroic polarizing filter 207 which passes red, green and blue light in the horizontal polarizing direction. By on/off control of the two TN mode liquid crystal elements 203 and 206 using a cell driver 208, the three primary colors can be generated by successive blocking periods.

Two TN mode liquid crystal elements 203 and 206 are shown at the very top of FIG. 6, both in the "off" condition. In this case, in passing the white light through the BG dichroic polarizing filter 201, the blue and green light is polarized in the vertical direction and passes through, and on passing through the red dichroic polarizing filter 202, the red light is polarized in the horizontal direction and passes through. Subsequently, on passing through the liquid crystal element 203 in the "off" condition, the polarizing directions of the respective light colors are changed by 90 degrees, so that the red light becomes polarized in the vertical direction and the blue light and green light become polarized in the horizontal direction. Then, while passing through the B dichroic polarizing Filter 204 and the RC dichroic polarizing filter 205, since the polarizing directions of each of the polarizing filters match the polarizing directions of the red light and blue light, this light passes straight through. However, since the polarizing direction of the green light is perpendicular, this light is blocked off. Subsequently, with the liquid crystal element 206 in the "off" condition, the polarizing direction of the red light is changed to the horizontal direction, and that of the blue light is changed to the vertical direction as it passes through. Then, on passing through the final RGB dichroic polarizing filter 207, the red light passes straight through. However since the polarizing direction of the blue light is perpendicular, this light is blocked off. Hence only red light is output.

In a similar manner, as shown in the center of FIG. 6, by controlling the liquid crystal element 203 to "off" and the liquid crystal element 206 to "on", then only blue light is output, and as shown at the bottom of FIG. 6, by controlling the liquid crystal element 203 to "on" and the liquid crystal element 206 to "off", only green light is output. Moreover, although not shown in FIG. 6, by controlling both the liquid crystal elements 203 and 206 to "on", all of the colors of the light are blocked off. Accordingly, by arranging these color polarizer and TN mode liquid crystal elements and by carrying out the above-mentioned four switching operations in the cell driver 208, the red light, green light, and blue light can be generated in successive repetition by the blocking periods, in a similar manner to that in the before-mentioned related art examples.

A liquid crystal shutter having such a function is placed on the front face of a black and white display screen, and R, G, B signals are output in succession to both the black and white display and to the liquid crystal shutter. As a result the image signal for each color component appears in black and white on the black and white display, and at the same time the light image signal appearing on the black and white display is passed through the liquid crystal shutter. Hence an amount of light corresponding to the image signal for each R, G, B color component is alternately passed through the liquid crystal shutter, so that the human eye recognizes the light images for each color component as a composite color image.

As follows is a description of a color image display apparatus for displaying a color image according to the method of the present invention.

Figure 1:
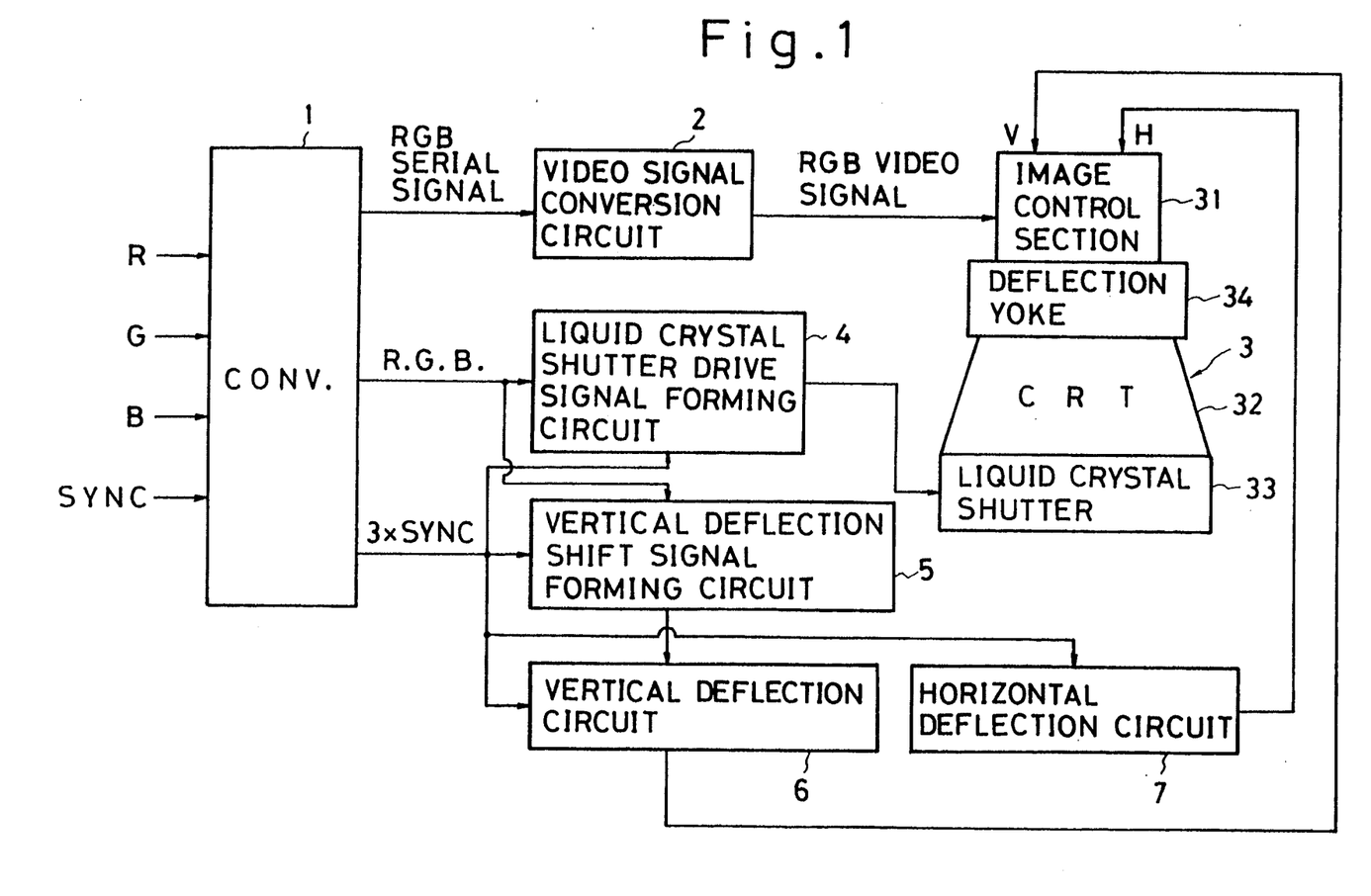
FIG. 1 is a block circuit diagram showing a circuit construction according to a first embodiment of the present invention.

As shown in FIG. 1, the R, G, B image signals for each color component of a color resolved frame color image signal from a color television camera and the like, are input together with the vertical synchronous signal (SYNC) for carrying out switching of the field, into a converter 1 which acts as an signal processing means.

The construction of the converter 1 includes a memory for temporarily storing at least an amount of data for one field of the before-mentioned respective signals, and a signal forming circuit for forming a serial signal by reading image data from the memory. The converter 1 reads sequentially from the R, G, B data stored in the memory in a predetermined color sequence and at three times the speed of the field cycle, and outputs a serial signal, with an interval required for vertical deflection (equivalent to one third of the interval of the before-mentioned SYNC) inserted. That is to say, the R, G, B image data is connected in series and output as an RGB serial signal of three times the speed.

The RGB serial signal is output via the video signal conversion circuit 2, to the image control section 31 of a black and white display 3 which acts as a black and white image display means.

Also, while forming and outputting the previously mentioned RGB serial signal, the converter 1 outputs a synchronized R, G, B selection signal, and this signal is input to the liquid crystal shutter drive signal forming circuit 4 and to the vertical (V) deflection shift signal forming circuit 5.

Furthermore, the converter 1 trebles the speed of the before-mentioned vertical synchronous signal SYNC, and control of reading from the memory is carried out based on this signal (3×SYNC). This signal is output to the liquid crystal shutter drive signal forming circuit 4, the vertical (V) deflection shift signal forming circuit 5 the vertical deflection circuit 6, and the horizontal deflection circuit 7.

The liquid crystal shutter drive signal forming circuit 4 forms a liquid crystal drive signal for selecting and passing an R, G, or B color corresponding to the respective input R, G, B selection signal, and a drive signal to stop light transmission during the period corresponding to the vertical synchronous signal (SYNC) inserted between the R, G, B signals. These drive signals are output to the liquid crystal shutter 33 acting as a light color changing means, which is arranged on the front face of a CRT 32 screen of the before-mentioned black and white display.

The vertical (V) deflection shift signal forming circuit 5 forms a signal for shifting the scanning of a specific color component (for example the G component), of the R, G, B signals, in a vertical direction by only half of the horizontal scanning line spacing. The circuit 5 selects the direction for shift depending on whether an odd number or even number field is detected from the 3×SYNC signal, and forms a vertical deflection shift signal to shift upwards for an odd number field, and downwards for an even number field. The circuit 5 then outputs the vertical deflection shift signal (interlace signal) to the vertical deflection circuit 6.

With the vertical deflection circuit 6, each time the before-mentioned vertical synchronizing signal which has been sped up is input, deflection scanning to move the CRT beam in a vertical direction to the scanning starting position is carried out. With regards to the R and B image signals, a vertical deflection control signal V for deflection to the same reference positions for the input odd number field, and even number field, is output to a deflection yoke 34 of the black and white display 3. However with the G image signal, in the case of an odd number field, the vertical deflection control signal is for vertical deflection to a position shifted by only half of the horizontal scanning spacing from the reference position in a downwards direction, and in the case of an even number field, is for deflection to a position shifted by only half of the horizontal scanning spacing front the reference position in an upwards direction. Moreover, for each horizontal synchronous signals (H. SYNC) in the field image signals for the respective color components, that is input to a horizontal deflection circuit 7, a horizontal deflection control signal H for deflection as far as the initial scanning position in the horizontal direction is output to the deflection yoke 34 of the black and white display 3.

The vertical deflection shift means is made up from the abovementioned vertical deflection shift signal forming circuit 5 and vertical deflection circuit 6.

With signal processing as outlined above, the respective R, G, B field images are scanned at three times the scanning speed of a standard television image scan for a successively input image, by using the RGB video signal, the before-mentioned vertical deflection control signal V, and the horizontal deflection control signal H. Also, when the image changes to the field image for the G component, vertical deflection is carried out while shifting alternately in the vertical direction by only half of the horizontal scanning spacing in opposite directions for the odd number field and for the even number field.

Figure 2:
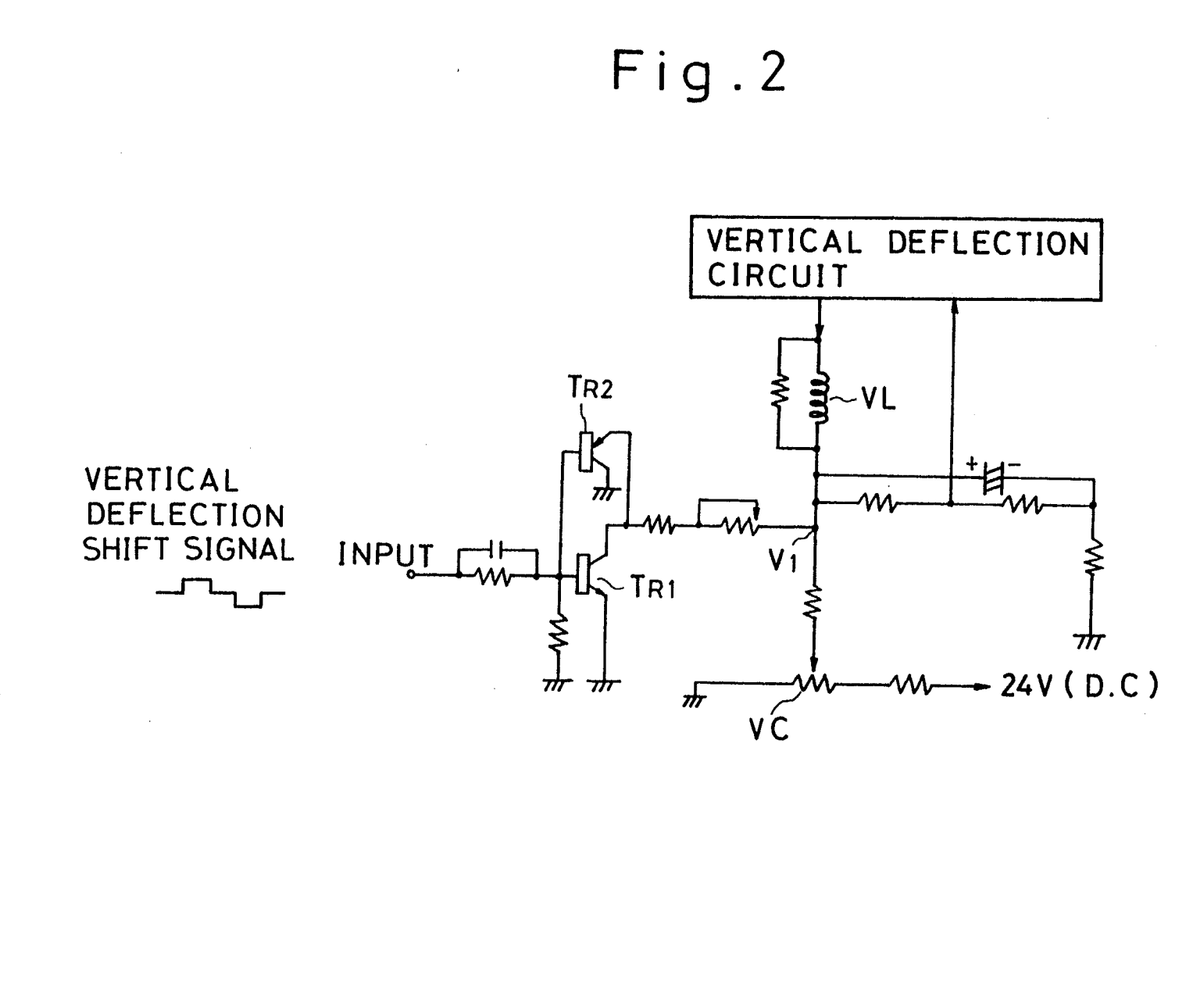
FIG. 2 is a circuit diagram showing an example of a construction of a vertical deflection shift circuit for the first embodiment.

FIG. 2 shows an example of a circuit for carrying out the above mentioned vertical deflection shift. In the circuit of FIG. 2, when the before-mentioned vertical deflection shift signal is input, the transistors TR1 and TR2 come "on" selectively depending on whether a vertically rising or vertically falling shift pulse is input, causing the terminal voltage V1 of the vertical deflection coil VL to be increased or decreased by a predetermined amount. As a result the voltage applied to a vertical centering section VC is increased or decreased, thereby effecting the before-mentioned vertical direction upward shift or downward shift by half of the horizontal scanning spacing.

Figure 3:
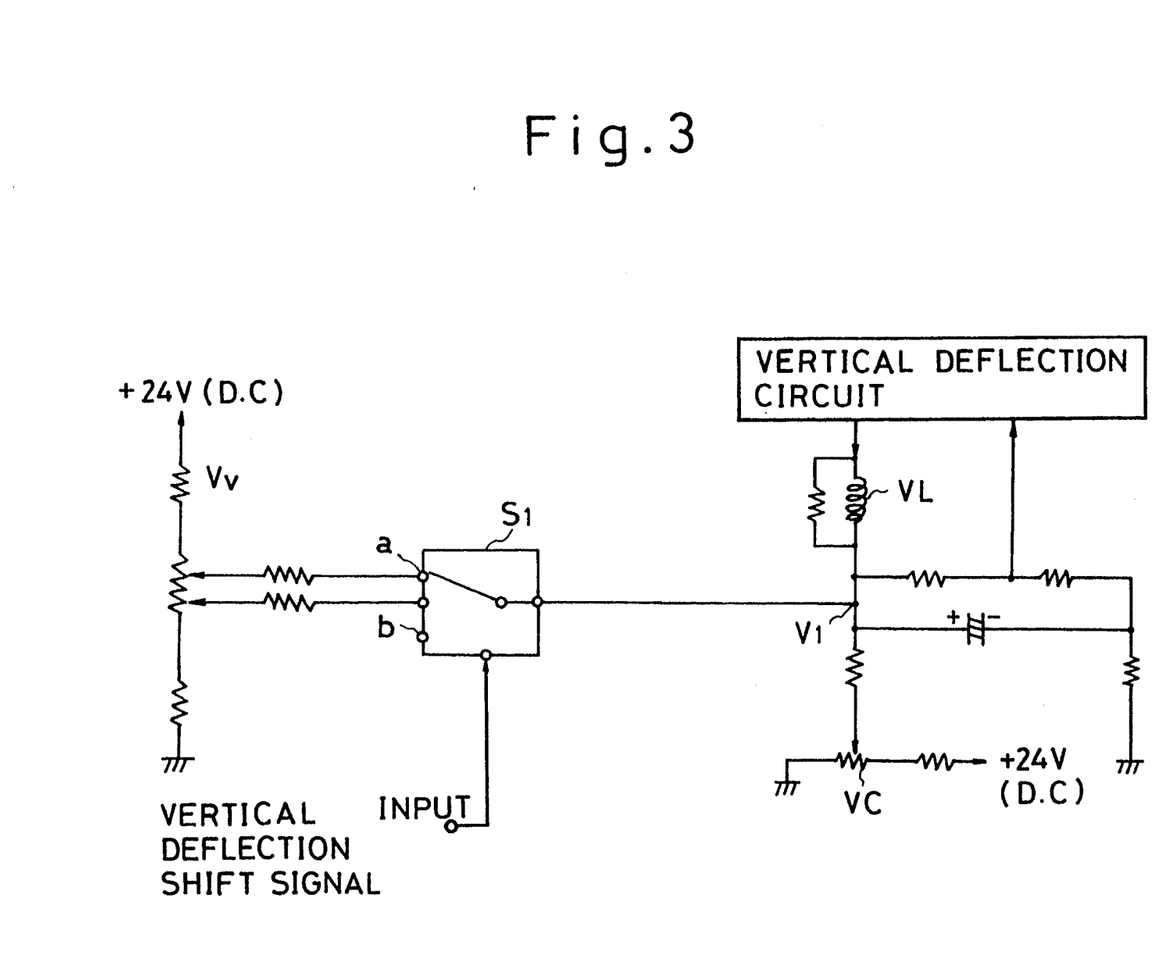
FIG. 3 is a diagram showing the construction of another example of a vertical deflection shift circuit for the first embodiment.

FIG. 3 shows an example of an alternative vertical deflection shift circuit. With this circuit, electric potentials which are predetermined amounts higher and lower than the terminal voltage V1 of the vertical shift coil VL, are taken from a voltage dividing circuit Vv, and connected to two fixed contact points "a" and "b" of a pulse interlock IC switching circuit S1. The switching circuit S1 is connected on a movable contact point side to the terminal of the vertical deflection coil VL. Vertical deflection shift signals are input to the pulse interlock IC switching circuit S1. When a vertical upward shift pulse is input, the contact point "a" is connected, and when a vertical downward shift pulse is input, the contact point "b" is connected. Thus shift can be carried out in a similar manner to that for the previous circuit of FIG. 2.

With the present embodiment, by shifting only the G component (the central component of the color sequence) in the vertical direction, the synchronous signal for deflection takes on an interlace scanning pattern with signals for odd number fields and even number fields repeated alternately. Clearly, by a similar method the same function can be obtained by shifting the R, and B components (the components at each end of the sequence), although in this case the number of pulses for vertical shift is doubled.

Figure 4:
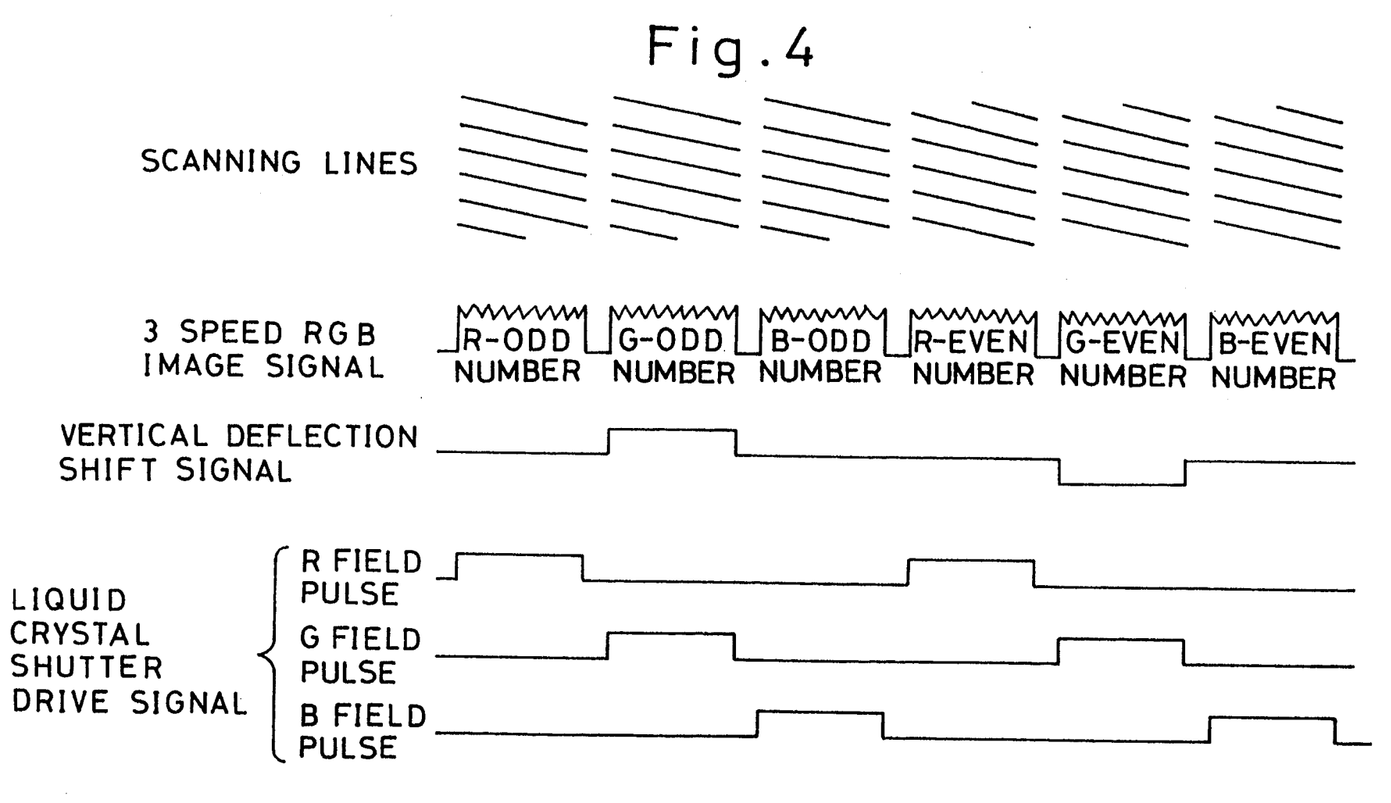
FIG. 4 is a timing chart showing scanning conditions and various types of signals for the first embodiment.

The respective signal conditions and image scanning conditions for such scanning are illustrated in FIG. 4.

In this scanning, the field image for the G component input by the odd number field is essentially changed into an even number field as a result of the deflection being vertically shifted in a downward direction by only half of the horizontal scanning spacing amount. Similarly the field image for the G component input by the even number field, is vertically shifted in an upwards direction by only half of the horizontal scanning spacing amount and changed into an odd number field image. Consequently, interlace scanning wherein the odd number field and even number field are alternately changed is carried out. The resultant effect however is of scanning on the display screen which corresponds to the field of the input signal.

A black and white image is displayed on the CRT 32 screen of the black and white display 3 which scans in the above manner. However, on passing through the liquid crystal shutter 33 on the front face, the non color light image signal of the black and white image signal is changed successively to a light image signal having an R, G, B color component by the liquid crystal shutter 33, synchronized with the scanning cycle of the before-mentioned respective R, G, B image signals. As a result the respective color components are visually perceived as composite color images.

Also, since the RGB image signal is scanned at three times the speed of the original signal, the images can follow the precise movement of a moving image. As well as this, it is not necessary to produce the odd number field screen signals so as to be centrally inserted between the even number field screen signals. The display, therefore, be on a black and white Braun tube rather than a color display on a standard Braun tube comprising a dot triad. Hence an image having high resolution can be obtained.

Moreover, when compared with the image of a standard color television monitor, since separated R, G, B color generating regions must be provided for each of the pixels on the screen of the standard color television monitor, there are limits to improvement of the resolution regardless of other restrictions. With the liquid crystal shutter system however, since image display can be in black and white, there is no requirement to divide the pixels up into regions for each color component. Consequently the whole of the screen area can be used for each color component so that it is possible to significantly increase the resolution.

Furthermore, although a device using a TN mode liquid crystal elements was used for the liquid crystal shutter in the before-mentioned embodiment, a liquid crystal shutter using a guest-host mode liquid crystal element may be used. In this case the liquid crystal may be colored using a liquid crystal with light absorption coefficients showing two coloring characteristics which differ in the horizontal and the vertical direction along the longitudinal axis of the molecule, and coloring or non coloring of the passing light can be changed by on/off switching of a voltage.

Moreover an arrangement such as that described in unpublished Japanese patent application No. 3-247619 may be used. This is constructed with a color separation system and a twisting mechanism having a function of passing color component light and blocking dispersed light, interposed in a similar sequence. The color separation system has a plurality of dichroic mirrors, and high molecular composite bodies made from a high molecular composite having liquid crystal particles dispersed within a high molecular matrix, having a function of changing between transmission and scattering of light with applied voltage control. The high molecular composite bodies are respectively interposed in the color component light paths separated by means of the dichroic mirrors. With this arrangement, the various color components can be passed alternately by successively changing the high molecular composites to pass light.

In the embodiment the converter 1 and other circuit components may be provided as separate components separate from the monitor, or may be housed in the monitor as a single unit.

With the present invention as described above, since the field image signal for each color component is constructed for high speed interlace scanning in a predetermined color sequence, a moving in-rage can be precisely followed. Moreover a high definition can be obtained with a stabilized high quality color image devoid of flicker.

What is claimed is:

1. A method for displaying color images comprising:
   a signal processing step, wherein the field image signals for each color resolved component of a frame color image signal comprising odd number and even number field images, are connected together in series in a predetermined color sequence as odd number field groups and even number field groups, and changed into a signal having the color components sped up several times,
   a vertical deflection shift step, wherein said changed signal is output to a black and white image display means having an interlace function to display odd number field images and even number field images alternately by a vertical deflection control on an electron beam of a cathode ray tube, and said vertical deflection control in said black and white image display means is adjusted so that a signal for a characteristic color component of said change signal is shifted by only half the horizontal scanning spacing in a vertical direction, with the signals for the odd number field images and even number field images being shifted in opposite vertical directions, and the shifted signals are scanned on said black and white image display means, so that the odd number and even number field images are displayed at respective established locations on the black and white image display means, a light color changing step, wherein a signal which has been divided up corresponding to the color component signal of said changed signal, is input and the non color light signal displayed on said black and white display means is changed into a light signal having a color component corresponding to the input signal.

2. A method for displaying color images as claimed in claim 1, wherein said light color changing step is carried out by changing the drive of a liquid crystal shutter.

3. An apparatus for displaying color images comprising:

a signal processing means, whereby the field image signals for each color resolved component of a frame color image signal comprising odd number and even number field images, are connected together in series in a predetermined color sequence as odd number field groups and even number field groups, and changed into a signal having the color components sped up several times, a vertical deflection shift means, whereby said changed, signal is output to a black and white image display means having an interlace function to display odd number field images and even number field images alternately by a vertical deflection control on an electron beam of a cathode ray tube, and said vertical deflection control in said black and white image display means is adjusted so that a signal for a characteristic color component of said change signal is shifted by only half the horizontal scanning spacing in a vertical direction, with the signals for the odd number field images and even number field images being shifted in opposite vertical directions, and the shifted signals are scanned on said black and white image display means, so that the odd number and even number field images are displayed at respective established locations on the black and white image display means, a light color changing means, whereby a signal which has been divided up corresponding to the color component signal of said changed signal, is input and the non color light signal displayed on said black and white display means is changed into a light signal having a color component corresponding to the input signal.

4. An apparatus for displaying color images as claimed in claim 3, wherein said light color changing means is a liquid crystal shutter and a drive means therefor.

* * * * *